(12) United States Patent
Faltysek

(10) Patent No.: US 7,234,535 B2
(45) Date of Patent: Jun. 26, 2007

(54) APPARATUS FOR TURF AERIFICATION

(76) Inventor: Daniel R. Faltysek, 300 Kirkstall #722, Houston, TX (US) 77090

( * ) Notice: Subject to any disclaimer, the term of this patent is extended or adjusted under 35 U.S.C. 154(b) by 0 days.

(21) Appl. No.: 10/527,611

(22) PCT Filed: Feb. 26, 2004

(86) PCT No.: PCT/US2004/005772

§ 371 (c)(1),
(2), (4) Date: Mar. 11, 2005

(87) PCT Pub. No.: WO2004/077927

PCT Pub. Date: Sep. 16, 2004

(65) Prior Publication Data

US 2006/0070748 A1    Apr. 6, 2006

Related U.S. Application Data

(60) Provisional application No. 60/450,847, filed on Feb. 28, 2003.

(51) Int. Cl.
*A01B 45/02* (2006.01)
(52) U.S. Cl. ............... 172/21; 172/52; 172/111
(58) Field of Classification Search ................. 172/21, 172/22, 41, 52, 104, 103, 35, 96, 110, 111
See application file for complete search history.

(56) References Cited

U.S. PATENT DOCUMENTS

| | | | | |
|---|---|---|---|---|
| 2,918,130 A | * | 12/1959 | Thom | 172/22 |
| 3,015,364 A | * | 1/1962 | Fitzgerald | 172/22 |
| 3,598,068 A | * | 8/1971 | Rosendahl et al. | 111/7.1 |
| 4,282,943 A | * | 8/1981 | Leitner | 175/394 |
| 4,476,938 A | * | 10/1984 | McKay | 172/22 |
| 5,509,487 A | * | 4/1996 | Dufty et al. | 172/21 |
| 6,352,122 B1 | * | 3/2002 | Love | 172/371 |
| 6,955,227 B1 | * | 10/2005 | Motosko | 172/25 |

* cited by examiner

*Primary Examiner*—Victor Batson
(74) *Attorney, Agent, or Firm*—Wong, Cabello, Lutsch, Rutherford, & Brucculeri, LLP

(57) ABSTRACT

A novel drill for the aerification of turf grasses is disclosed. The drill comprises a chuck and a fluted turf drill bit held by the chuck. The chuck includes a locking mechanism which permits the chuck to rotate freely about its longitudinal axis when loaded in compression (as when the drill is inserted into the ground) but which locks, preventing rotation, when the drill is loaded in tension (such as when the drill is withdrawn from the soil). The drill bit has a smooth upper section and a fluted lower section. The smooth section decreases the probability of entangling the turf in the drill bit with subsequent lifting of the turf when the drill is withdrawn. The tip of the drill bit is adapted to provide a torque to the drill bit during insertion into the ground. Thus, the bit spirals into the ground upon insertion, but locks upon removal, thereby permitting the flutes of the bit to cut a cylindrical hole in the ground while removing soil from the hole by retaining it in the space between the flutes. The drill of the present invention may be used in aerators previously limited to solid or hollow-core tines.

8 Claims, 3 Drawing Sheets

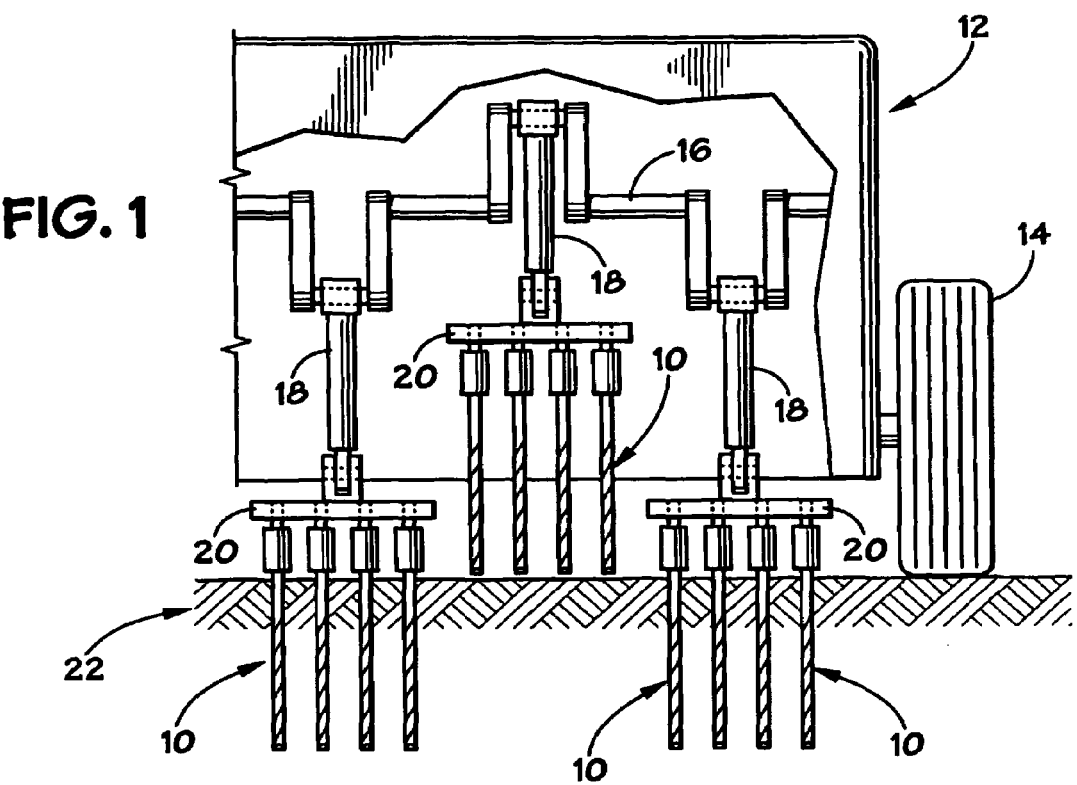
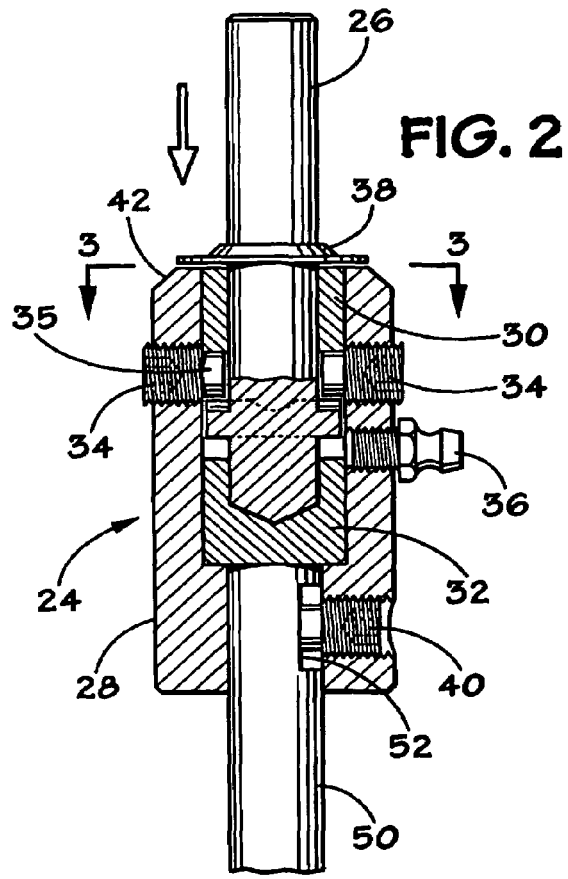
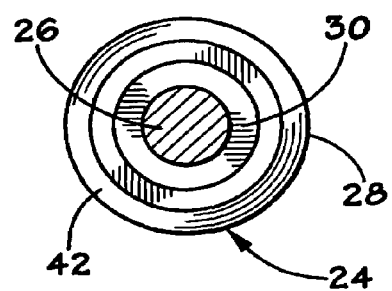
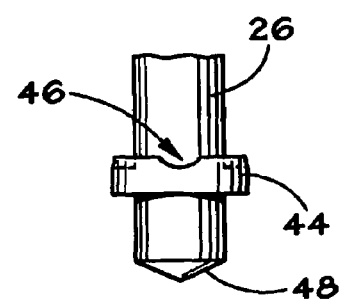

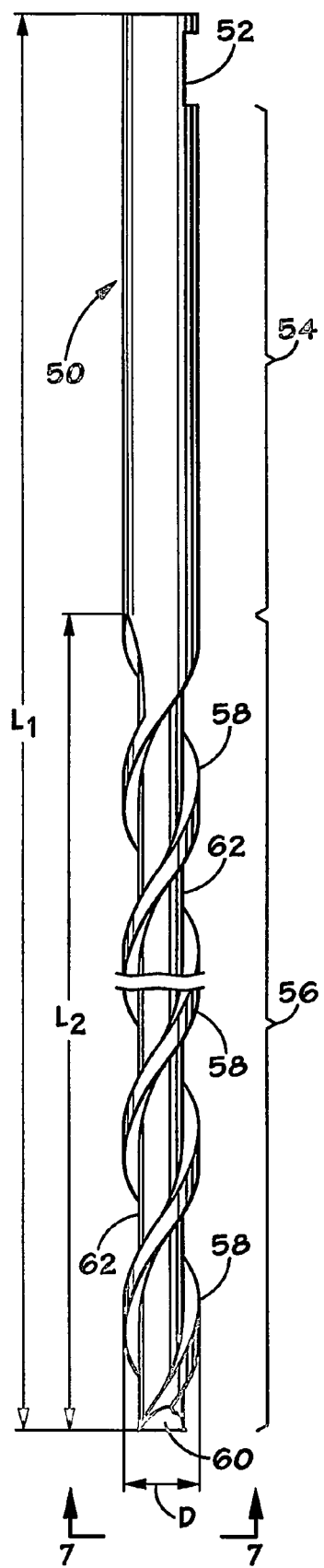
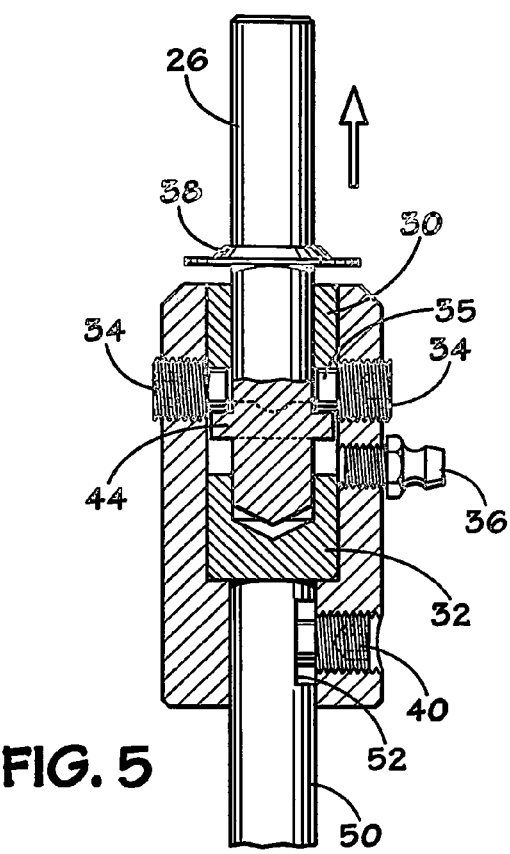
FIG. 5
FIG. 6
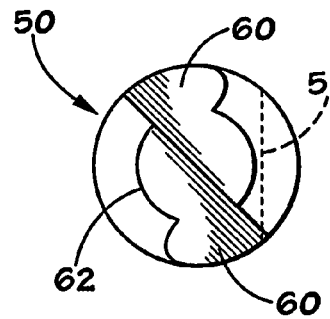
FIG. 7
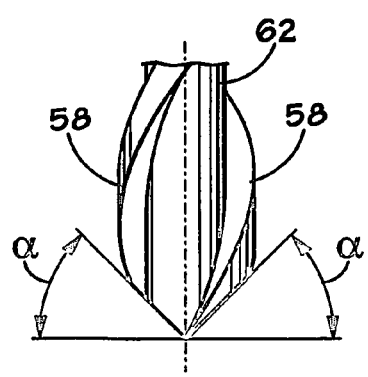
FIG. 8
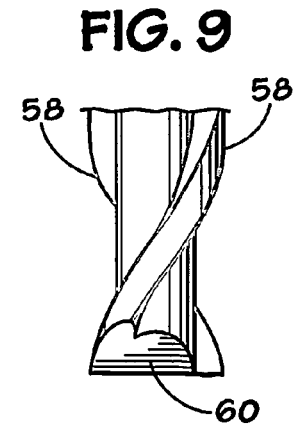
FIG. 9

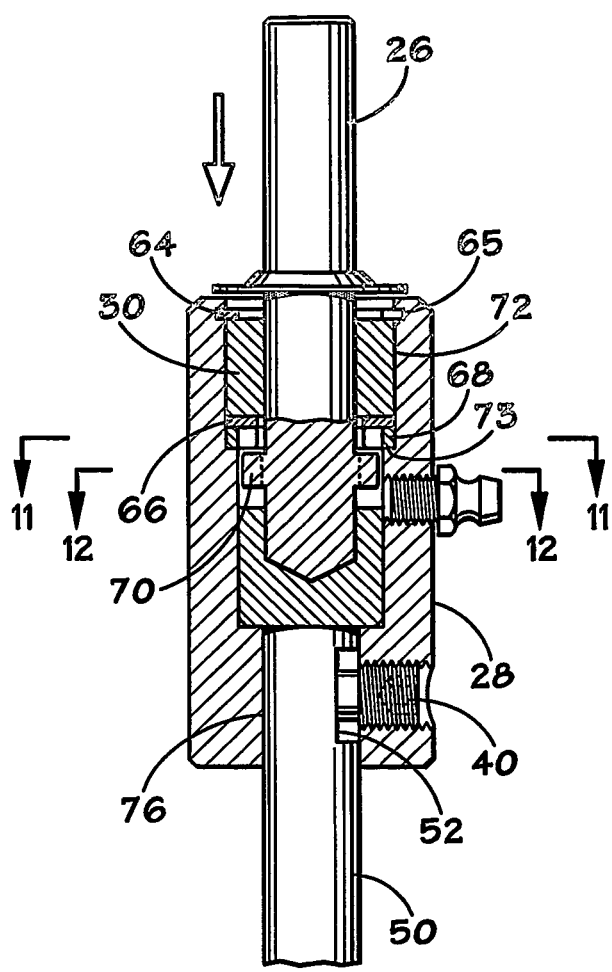 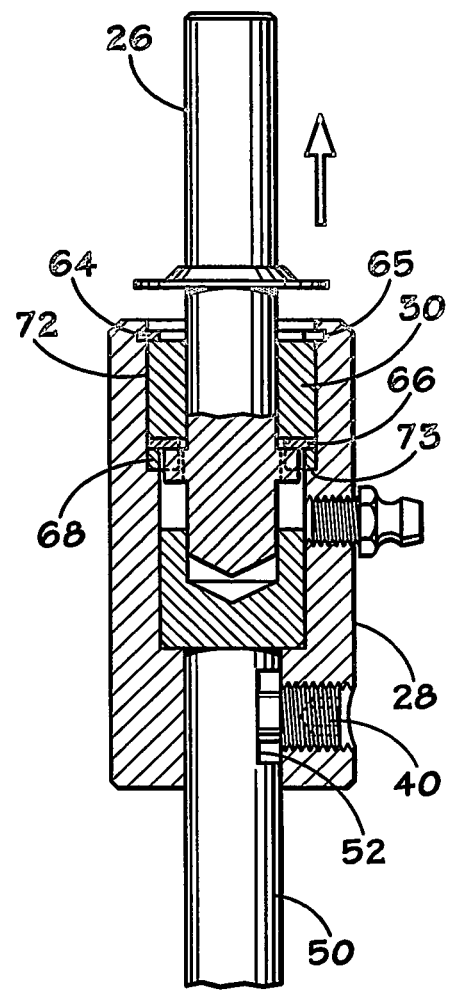
FIG. 10   FIG. 13
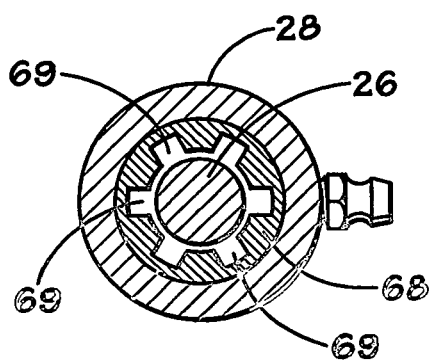 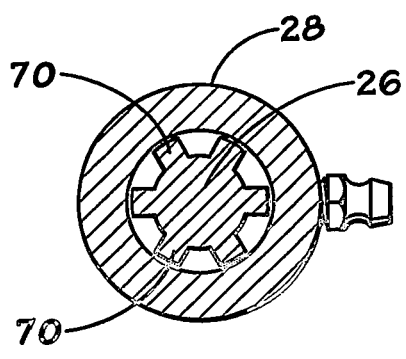
FIG. 11   FIG. 12

APPARATUS FOR TURF AERIFICATION

CROSS-REFERENCE TO RELATED APPLICATIONS

This application is a continuation of U.S. Provisional Patent Application Ser. No. 60/450,847 filed Feb. 28, 2003, to which priority is claimed under 35 U.S.C. §120 and which is incorporated herein by reference in its entirety.

BACKGROUND OF THE INVENTION

1. Field of the Invention

This invention relates to soil aerification (or "aeration"). More particularly, it relates to a method and apparatus for the aerification of turf grasses using a self-rotating turf drill.

2. Description of the Related Art

What is Aerification

Aerification is a mechanical process that creates more air space in the soil and promotes deeper rooting, thus helping plants stay healthy. In most cases, this is achieved by removing cores (often called plugs) and then filling the holes with topdressing. Topdressing is often a certain grade of sand which may have other amendments added to allow the soil to maintain air space, improve water penetration, and encourage healthy root growth. The sand is brushed or poured into the holes which are usually healed within several days.

The condition of turf largely depends on the events occurring below the surface. For grass to grow, deep healthy roots are needed, and roots require oxygen. In good soil, they receive oxygen from tiny pockets of air trapped between soil and sand particles. On a sports field, the everyday traffic from players combined with the weight of heavy mowing equipment causes the soil to become compacted and the air pockets on which the roots depend for oxygen are lost. Aerification is a mechanical process that creates more air space in the soil and promotes deeper rooting, water percolation and compaction relief.

The practice of aerating turf is becoming increasingly widespread. The benefits of aerification include:
 improved water infiltration and better drainage
  Deeper penetration of fertilizers
  Improved plant rooting
  Thatch control
  Increased stress tolerance
 Break up of sod layers that can restrict rooting and water movement
 Release of toxic gases from soils
 Increased drying and drainage of persistently wet soils
 Loosening of soil, allowing for increased air space
 Softening of sports fields to reduce risk of injury The principal reason for aerification is soil compaction relief. In addition, putting green aerification can provide for additional surface smoothing.

Compaction Relief

Definition of Compaction

Compaction of sports playing fields and golf course tees, greens and fairways is an inevitable product of their use—golf carts, maintenance machinery and feet all contribute to the process that is defined as "the consolidation of soil particles." Compaction decreases water and oxygen movement in the soil, hinders root growth and lessens the ability of the soil to drain. Soil compaction causes these negative effects by turning macropores (larger voids in the soil largely responsible for drainage and air flow) into many micropores (smaller voids that hold water). As compaction increases, bulk density also usually increases, which means that more soil solids occupy a unit volume of soil, reducing the porosity.

With turfgrass, techniques used to relieve compaction must be effective without being highly visible. Aerification—either with solid tines that create a hole in the soil, or with hollow tines or drills that remove a core of soil—is one of the more common ways of improving compacted soils.

When a soil compaction condition is accompanied by excessive thatch buildup, as is almost always the case in poorly maintained turf, each condition contributes to the effect of the other. Thatch is a mat of undecomposed plant material (e.g., grass clippings) accumulated next to the soil in a grassy area (as a lawn, sports field or putting green). It is a tightly intermingled layer of living and dead stems, leaves and roots of grasses, which develops between the layer of green vegetation and the soil surface. When thatch exceeds about ½ inch of undecomposed material, it acts as a barrier to water and air infiltration into the soil below and will provide an environment encouraging turf diseases and harmful insects. Compacted soils, on the other hand, are subject to greater temperature extremes than loose soils, because of limited air movement; microbial activity necessary to thatch decomposition is reduced or halted.

Water that cannot penetrate the soil runs off or accumulates in low spots where it harbors fungus growth.

Alleviating either condition will help, but only when thatch is kept under control and the soil is properly aerified will turf have the best chance for healthy, vigorous growth and disease resistance.

The accumulation of organic matter (thatch) and fine particles (silt and/or clay) can, over time, produce a surface layer that reduces porosity. Aerification can modify the profile, improving oxygen, water, and root movement, especially when the use of hollow tines or turf drills is combined with core removal and backfilling channels with high-quality topdressing sand.

Prior Art Methods of Aerification

Turfgrass cultivation activities include hollow tine aerification, solid tine aerification, spiking, slicing, and water injection. These activities, to varying degrees, can reduce thatch, prepare turf for overseeding, and relieve soil compaction. Perhaps the best machine for working large areas is a piston driven aerator that thrusts the core cutters vertically. Direct up and down coring leaves a clearly defined hole. Drum-type roller aerators will work but may cause tearing damage to the remaining grass since this type of cutter enters the turf at one angle, moves in an arc with the drum movement, and is withdrawn at a different angle.

Solid Tine

Solid-tine aerification allows turf managers to aerate more frequently, since the procedure produces less surface disruption. Solid tines larger than ¼ inch in diameter open turf to allow water and air infiltration, but the process compresses displaced soil downward and to the sides. This actually increases soil compaction around newly created aerification holes. Repeated solid-tine aerification with larger-diameter tines can create a hardpan at the aerating depth.

Related to solid tine aerification are slicing and spiking aerifiers. Slicing, spiking, and solid tine aerification do not pull plugs of soil from the turf. Slicing aerifiers cut thin slits into the soil and spiking aerifiers cut thin, triangular-shaped holes in turf. While they do not relieve soil compaction as efficiently as hollow tine aerification, these practices cause less surface disruption and can be done anytime.

Hollow Tine

These devices pull out plugs of soil that are deposited on the surface. One of the most common operations that one can perform using a hollow tine aerator is conducting a soil exchange program, offering the professional an ideal opportunity to remove soil cores and replace them with a suitable top dressing, altering the soil profile.

Self-powered hollow tine aerifiers (core aerifiers) insert hollow tines into the soil, removing a soil plug ¼" to ¾" in diameter and 2" to 12" deep, depending or, soil type, soil moisture, and type of machine. Core spacing varies depending upon the make and model of the machine. In general, the more cores removed per square foot, the more effective the cultivation will be; removing fifteen to thirty cores per square foot is recommended. Hollow tine aerification is considered the most efficient compaction reliever of the prior art methods. It is preferably done during active turf growth.

Slitting

Using triangular blades ranging in size 100–250 mm (4" to 10"), these machines create lots of short, narrow, close slits; slitting is useful for getting air down into the soil; it's quick; it does a fair job in dethatching; however, this approach is not highly effective at reducing compaction. Slitting also has its benefits, particularly in autumn when it can be employed to help 'connect' the surface of the soil with the underlying drainage layers. In the spring and summer, slitting ensures that water from rain and irrigation soak through the turf rather than being shed in a sideways fashion by the thatch.

Water Injection

Water injection aerification is a recently-introduced method of turf aerification. Water, under high pressure, is injected into the turf surface to relieve soil compaction. In addition, it can be used to inject turf management chemicals into the soil. It causes little surface disruption and can be done anytime during the growing season. This new technology has not been commonly available for use outside of golf course applications.

Deep Drill Aerification

Drill-type aerifiers employ rotating turf drills. The drill bits eliminate compaction along the sides and bottom of the aerification hole, and allow for quick and effective penetration even in heavily compacted soils including hardpan, muck and roots. The "gentle footprint" of drill-type aerifiers, in conjunction with the absence of cyclic vibration and the "straight in, straight out" action of the drill bits, gives this type of machine the capability of aerating fields that are wet, dry or experiencing periods of high stress.

Deep drill aerifiers are also preferred for use in all problem areas because the rotating drill bits will penetrate subsoil areas, where other machines tend to walk or bounce, often causing trauma to the playing surface. Turf drill bits fracture the cylinder wall without glazing, thereby allowing lateral movement of air and water. "Drill & Fill" aerifiers are available which back-fill the drilled holes with a selected top dressing, usually sand, thereby modifying the soil profile.

Turf drill bits are commercially available in ⅝"×12", ⅝"×16", ¾"×12", and 1"×12" sizes. One particular deep drill aerifier currently on the market produces 5" spacing of holes. Drill aerification is especially preferred when one must penetrate hard soils. However, drill aerification is a very slow process as compared to reciprocating type aerifiers.

As noted above, aerification has the added benefit of smoothing the surface of a putting green. The process of punching holes and either reincorporating the plugs brought up or removing the plugs and filling the channels can offer some surface smoothing. Surface topdressing alone will fill/smooth low spots. The combination of aerifying and the follow-up topdressing will, over time, both fill low spots and soften high spots, resulting in more efficient surface smoothing than topdressing alone.

SUMMARY OF THE INVENTION

The method and apparatus of the present invention combines the speed and mechanical simplicity of solid or hollow tine aerification with the penetration depth, clean cutting and cylinder wall fracturing of deep drill aerification. A turf drill is held in a chuck which permits free rotation of the drill bit when it is pushed into the ground (loaded in compression) but which restricts rotation of the bit when it is withdrawn from the ground (loaded in tension). When the chuck is locked and the drill bit is pulled from the soil, the flutes on the bit cut a clean, generally cylindrical hole in the soil with minimal compaction of the surrounding earth. In one embodiment, the drill bit comprises a non-fluted upper portion which helps prevent entanglement and lifting of the turf as the bit is withdrawn.

In some embodiments, the distal end of the drill bit is provided with opposing beveled surfaces which impart a rotational movement to the bit as it is pushed into the soil. Since the bit is self-rotating, there is no need for rotational means in the aerifier head, and therefore drills according to the present invention can be utilized in aerifiers previously equipped with solid or hollow-core tines. Since rotational means are not needed in the aerifier's heads, the tines may be placed in greater proximity to one another which permits greater density of aerification holes.

BRIEF DESCRIPTION OF THE DRAWINGS

FIG. 1 is a partial cut-away view of a simplified, reciprocating-type aerifier equipped with a turf drill according to the present invention.

FIG. 2 is a partial cross-sectional view of the chuck of the present invention in its free rotation state.

FIG. 3 is a cross-sectional view taken along line 3—3 in FIG. 2.

FIG. 4 is a side view of the lower portion of the central shaft of the chuck.

FIG. 5 is a partial cross-sectional view of the chuck of the present invention in its locked, rotation-inhibiting state.

FIG. 6 is a side view of a drill bit according to the present invention.

FIG. 7 is an end view of the tip of the drill bit illustrated in FIG. 6 taken along line 7—7.

FIG. 8 is an enlarged, side view of the tip of the drill bit illustrated in FIG. 6.

FIG. 9 is an enlarged, side view of the tip of the drill bit illustrated in FIG. 6 rotated 90°.

FIG. 10 is a partial cross-sectional view of another embodiment of the chuck of the present invention in its free rotation state.

FIG. 11 is a cross-sectional view taken along line 11—11 in FIG. 10.

FIG. 12 is a cross section taken along line 12—12 in FIG. 10.

FIG. 13 is a partial cross-sectional view an alternative embodiment of the chuck of the present invention in its locked, rotation-inhibiting state.

DETAILED DESCRIPTION

In the following description, "drill" should be understood to mean an apparatus comprising both a drill chuck and a drill bit held within the chuck.

Referring now to FIG. 1, a portion of a reciprocating turf aerator is shown as a partial cut-away drawing. The aerator is shown in simplified form to illustrate how the turf drill of the present invention may be used in practice. Aerator 12 may be moved across an expanse of ground such as soil 22 on wheel(s) 14. Reciprocating heads 20 are connected to crankshaft 16 by connecting rods 18 which cause heads 20 to move generally up and down as crankshaft 16 rotates. Drills 10, attached to heads 20, are thereby alternately thrust into and withdrawn from soil 22. In some commercially-available aerators, crankshaft 16 is driven by the power take off (PTO) of a tractor used to pull aerator 12 across a putting green, for example.

As mentioned above, this is a simplified view of a reciprocating aerator. Commercial aerators are typically equipped with articulating heads that additionally move fore and aft relative to the track of the aerator across the ground such that during insertion, withdrawal and the interval there between during which the drill bits are in the soil, the heads and drills (or tines) do not move transversely with respect to the ground. In this way, cylindrical, vertical holes may be achieved while the aerator advances continuously across the ground. Apparatus which provide this type of motion are described in U.S. Pat. No. 6,041,869 entitled "Turf Aerator with Constantly Vertical Tines" and are available from manufacturers such as Redexim/Charterhouse, Jacobsen (under the Ryan® brand name) and others.

The chuck 24 of one particular embodiment of the present invention is shown in partial cross section in FIG. 2. Shaft 26 may be adapted at its upper or distal end to engage the head platforms 20 of a mechanical aerator. Reciprocating aerators are particularly preferred, but the drill embodiments illustrated in the drawing figures can be employed in a variety of aerators.

The proximal end (lower end in FIG. 2) of shaft 26 is contained within rotating body 28 of chuck 24 and is rotatably supported by bushing 30 and thrust bearing 32. In the particular embodiment illustrated in FIG. 2, the proximal end of shaft 26 has conical tip 48 (see FIG. 4) which fits within a corresponding conical portion of bearing 32. Bushing 30 and thrust bearing 32 may be fabricated from a softer metal than that used for shaft 26 to reduce frictional wear. Additionally, chuck 24 may be provided with grease fitting 36 (also known as a Zerk fitting) through which a suitable lubricant may be introduced for lubricating shaft 26 within bushing 30 and bearing 32. One preferred lubricant is lithium grease. In other embodiments of chuck 24, self-lubricating bearings and bushings may be used, in which case it may not be necessary to provide means for introducing lubricant from an external supply.

Shaft 26 is free to both rotate within bushing 30 and thrust bearing 32 and to slide longitudinally (within limits, as described below) within bushing 30 and the upper, cylindrical portion of thrust bearing 32. As indicated by the arrow in FIG. 2, chuck 24 is shown loaded in compression such as would occur when the drill was being pushed into the ground. The conical tip at the proximal end of shaft 26 is shown fully engaged in thrust bearing 32 in FIG. 2 as it would be during insertion of the drill in the ground.

Chuck 24 comprises a lock which engages when a turf bit held in the chuck is loaded in tension and which disengages when the bit is loaded in compression. In the embodiment illustrated in FIG. 2, rotating body 28 has an opposing pair of set screws 34. The set screws 34 have a conventional threaded portion for engaging the threads of tapped holes within rotating body 28 and also a cylindrical tip 35 of reduced diameter which is sized to project into the upper central bore of rotating body 28. Such set screws are sometimes referred to as "dog point" set screws. In the embodiment illustrated, the holes in rotating body 28 into which set screws 34 are screwed are not threaded the full thickness of the wall of rotating body 28. Rather, the threads begin at the exterior surface of rotating body 28 and end prior to reaching the central bore of rotating body 28. In this way, the insertion of projecting points 35 may be limited. It is preferred that projecting points 35 do not contact shaft 26 when set screws 34 are fully seated within rotating body 28. The rotation and sliding of shaft 26 within rotating body 28 would be inhibited if projecting tips 35 were to contact shaft 26. Alternatively, bushing 30 may be sized and positioned such that the shoulders of set screws 34 contact bushing 30. In this way, over-insertion of set screws 34 may be prevented and bushing 30 may be secured within rotating body 28.

As illustrated in the detail of FIG. 4, shaft 26 includes stop collar 44 which prevents withdrawal of shaft 26 from rotating body 28 when a tensile force is applied to shaft 26 (such as occurs during withdrawal of the drill from the soil). Stop collar 44 may be provided on its upper surface with one or more indentions. In the embodiment illustrated, four such indentions are provided spaced 90° apart and each describes an arc of a circle in cross section. Indentations 46 and conical tips 35 of set screws 34 are preferably sized such that projections 35 will seat in indentations 46 when stop collar 44 is brought into contact with set screws 34. This condition is illustrated in FIG. 5.

FIG. 5 shows the same embodiment as that illustrated in FIG. 2. In this case, however, the drill is loaded in tension, as indicated by the arrow in the drawing. This condition obtains when the drill is being withdrawn from the soil and frictional forces on the drill bit 50 are opposing the upward motion imparted by the aerator. It will be noted that the conical tip of shaft 26 is partly withdrawn from the conical portion of thrust bearing 32 and stop collar 44 is in contact with cylindrical projections 35 of set screws 34. Further upward motion of shaft 26 relative to rotating body 28 is thereby prevented. Since stop collar 44 may be coated with lubricant, contact of the upper surface of stop collar 44 with cylindrical projections 35 may not inhibit the rotation of shaft 26 relative to rotating body 28 until an opposing pair of indentations 46 align with set screw projections 35 at which point shaft 26 may move slightly further upward, seating projections 35 within indentations 46 at which point further rotation of shaft 26 is significantly inhibited. It will be appreciated that the number and spacing of set screws 34 in rotating body 28 and the number and spacing of indentations 46 in stop collar 44 may vary from that of the embodiment shown in FIGS. 2 through 5.

Also shown in FIGS. 2 and 5 is dirt shield 38 which may be used to help deflect dirt, sand and other soil components from the interface of bushing 30 and shaft 26. Dirt shield 38 may be a stamped metal fitting which is concentric with shaft 26. Rotating body 28 may also be provided with chamfer 42 to further aid in the shedding of dirt from the top of rotating body 28. In operation in aerifiers having multiple drills in close proximity one to another, dirt particles are often thrown up by the drills as they are withdrawn from the ground which particles may land on nearby drill chucks. It is, of course, advantageous to shield bearings from the introduction of abrasive particles.

Also shown in FIG. 2 and FIG. 5 is the upper portion of the shank of turf drill bit 50. Rotating body 28 is provided with a central bore on its lower surface for receiving drill bit 50. Drill bit 50 may be provided with notch or flat 52 for engaging set screw 40 which both retains bit 50 within chuck 24 and prevents the rotation of bit 50 relative to rotating body 28. In the illustrated embodiment, set screw 40 is shown as being a dog point set screw. Set screw 40 may be a conventional set screw, but it may be convenient to have set screw 40 be of the same type and size as set screws 34 so as to reduce inventory and replacement parts requirements and to reduce the chance that a conventional set screw would be inserted in place of set screw 34 thereby impairing the function of chuck 24. Alternatively, set screw 40 may be a different diameter from that of set screws 34.

As will be appreciated by those skilled in the art, there are many ways a drill bit may be secured in a chuck. The securing method using a set screw described above and illustrated in the drawing figures has been found to be particularly suited to the application of the invention, but other methods may be used. By way of example, a hole may be provided in the chuck with a corresponding hole in the bit shank. A pin (such as a roll pin) or a machine screw passing through the hole in the chuck and into the hole in the bit shank would secure the bit in the chuck.

One embodiment of a drill bit of the present invention is shown in FIG. 6. Bit or drill tine 50 is comprised of an unfluted, generally cylindrical upper portion 54 and a lower, fluted section 56. As noted above, the upper portion of the shank of bit 50 may be provided with flat or notch 52 which provides a planar contact area for set screw 40 of chuck 24 used to secure bit 50 in the lower central bore of rotating body 28.

Flutes 58, which may be generally rectangular in cross-section, are formed in a helical pattern around core or central shaft 62. Smooth portion 54 is provided to lessen the chance of turf entanglement when the bit is withdrawn from the turf. In practice, the insertion depth may be adjusted such that fluted portion 56 penetrates to a soil depth just below the turf layer while portion 54 is within the turf layer.

Details of the tip of bit 50 are shown in FIGS. 7, 8 and 9. The tip may be formed by grinding generally planar, opposing flats 60 at the angle shown as a in FIG. 8. The position of notch 52 is shown as a dashed line in FIG. 7 to illustrate the angular position of the dividing line or "chisel edge" between the opposing flats 60. It will be noted that flats 60 are offset from each other with respect to the center line of the bit. Because of this offset, a torque is imparted to bit 50 (counterclockwise as viewed in FIG. 7) when it is inserted into the ground. Thus, when bit 50 is pushed into the ground by an aerator, it tends to rotate about its longitudinal axis and the flutes 58 create a pair of helical grooves in the soil around the central hole created by the displacement of the soil by central shaft 62.

Conventional turf drills typically are carbide tipped to maintain sharpness for an adequate length of time. It has been surprisingly found that the drill bits of the present invention do not require carbide tips or inserts to provide adequate service life. The drill bits of the present invention rotate about 2½ revolutions per insertion. In contrast, bits used in conventional turf drilling machines rotate about 25 revolutions per insertion. It is contemplated that the reduction in friction engendered by the factor of 10 decrease in rotations per insertion is responsible for the longer-wearing nature of the bits of the present invention.

In one particularly preferred embodiment, $L_1$ is about 10½ inches, $L_2$ is about 7½ inches and D, the drill tine's diameter, is about ½ inch. The shank diameter may be chosen to fit the head of the particular aerator to be used and it may be greater than, less than, or the same as the tine diameter. In this embodiment, the diameter of central shaft or core 62 is about ¼ inch and the flutes 58 are about 0.1 inch wide (thick) and 0.125 inch high. The twist length, the linear distance over which a flute makes a complete revolution about central shaft 62, is about 3 inches. The tip angle ($\alpha$ in FIG. 8) is about 45°. A particularly preferred drill tine is fabricated from American Iron and Steel Institute (AISI) Grade 4140 steel heat treated after fabrication to a value of at least about 50 on the Rockwell "C Scale" of hardness. Following heat treatment, drill tine 50 may be shot-peen finished.

It will be appreciated by those skilled in the art that there are many means for effecting the locking feature of the chuck of the present invention. By way of example, one such alternative is shown in FIGS. 10 through 13, inclusive. In this embodiment, a spline 70 or splines 70 on shaft 26 is used in conjunction with keyway 69 or keyways 69 in locking member 68 held within rotating body 28.

In the embodiment illustrated, bushing 30 is held within upper bore 72 of rotating body 28 by retaining ring 64 which fits within groove 65 in the wall of upper bore 72. Locking member 68 which may include a plurality of keyways 69 rests on shoulder 73 at the lower boundary of upper bore 72. Thrust washer 66 may be provided between locking member 68 and bushing 30 to protect the relatively softer material of bushing 30 from impact with splines 70 of shaft 26 when shaft 26 slides upward. Keyways 69 are sized and spaced such that splines 70 will fit within them when shaft 26 is urged upward (loaded in tension) and rotating body 28 rotates relative to shaft 26 until the splines 70 and keyways 69 align. FIG. 10 shows chuck 24 loaded in compression (as during insertion of the drill into the ground). In this condition, splines 70 are below locking member 68 and thus rotating body 28 can freely rotate relative to shaft 26. FIG. 13 shows chuck 24 loaded in tension (as occurs during withdrawal of the drill from the ground). In this condition, splines 70 engage keyways 69 in locking member 68 and rotation of rotating body 28 (and bit 50) relative to shaft 26 is prevented.

Locking member 68 may be fabricated as an extrusion cross cut to the desired thickness. Rotating body 28 may be heated to expand the diameter of upper bore 72 and locking member 68 inserted while the bore is expanded. Upon cooling and contraction, locking member 68 (if appropriately sized) will be rotatably secured within upper bore 72.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A turf drill comprising:
a rotating body having an upper central bore and a lower central bore for receiving a shank of a turf drill bit, the upper central bore having an upper cylindrical bushing and a lower bushing having a generally conical recess and the lower central bore having a set screw for engaging the shank of a turf drill inserted in the lower central bore;

at least one set screw in the rotating body having a generally cylindrical projection on one end thereof which projects into the upper central bore of the rotating body when the set screw is fully engaged in the rotating body;

a generally cylindrical shaft having a first end adapted to connect to a turf aerator and an opposing second end sized to rotatably and slidably fit within the upper central bore of the rotating body, said second end having a generally conical end adapted to fit within the conical recess of the lower bushing of the rotating body and a stop collar for preventing withdrawal of the shaft from the upper central bore of the rotating body when a tensile force is applied to the shaft, the stop collar having an upper surface and a lower surface, said upper surface having at least one lateral depression sized and shaped to engage the generally cylindrical projection of the set screw in the rotating body when a tensile force is applied to the shaft and torque is applied to the rotating body sufficient to rotate the rotating body such that the set screw projection is in axial alignment with the lateral depression in the upper surface of the stop collar thereby preventing further rotation of the shaft in the upper central bore of the rotating body; and, a turf drill bit having a generally cylindrical upper portion and a spirally fluted lower portion said upper portion being held in the lower central bore of the rotating body by the set screw.

2. A turf drill as recited in claim 1 wherein the upper busing and the lower bushing are self-lubricating.

3. A turf drill as recited in claim 1 further comprising a grease fitting on the rotating body in fluid communication with the upper central bore of the rotating body for lubricating the shaft engaged by the upper and lower bushings of the rotating body.

4. A turf drill as recited in claim 1 wherein the turf drill bit comprises a tip having a pair of offset, opposing, generally planar surfaces each at an acute angle to the long axis of the bit such that a torque is imparted to the bit when the tip is inserted into the ground.

5. A turf drill as recited in claim 1 wherein the turf drill bit comprises a pair of generally helical flutes.

6. A turf drill as recited in claim 5 wherein the flutes are generally rectangular in cross section.

7. A turf drill as recited in claim 1 further comprising a generally circular dirt shield mounted concentrically on the shaft proximate the upper cylindrical bushing.

8. A turf drill comprising:

a rotating body having an upper central bore and a lower central bore for receiving a shank of a turf drill bit, the upper central bore having an upper cylindrical bushing and a lower bushing having a generally conical recess and the lower central bore having a retainer for engaging the shank of a turf drill bit inserted in the lower central bore;

at least one generally cylindrical projection on the rotating body which projects into the upper central bore of the rotating body;

a generally cylindrical shaft having a first end adapted to connect to a turf aerator and an opposing second end sized to rotatably and slidably fit within the upper central bore of the rotating body, said second end having a generally conical end adapted to fit within the conical recess of the lower bushing of the rotating body and a stop collar for preventing withdrawal of the shaft from the upper central bore of the rotating body when a tensile force is applied to the shaft, the stop collar having an upper surface and a lower surface, said upper surface having at least one lateral depression sized and shaped to engage the generally cylindrical projection on the side of the rotating body when a tensile force is applied to the shaft and torque is applied to the rotating body sufficient to rotate the rotating body such that the projection is in axial alignment with the lateral depression in the upper surface of the stop collar thereby preventing further rotation of the shaft in the upper central bore of the rotating body; and, a turf drill bit having a generally cylindrical upper portion and a spirally fluted lower portion said upper portion being held in the lower central bore of the rotating body by the retainer.

* * * * *